Oct. 20, 1936.  R. G. STAYMAN  2,057,855
OPHTHALMIC LENS SUSPENSION
Filed April 19, 1934

INVENTOR.
ROBERT G. STAYMAN
BY W. S. Babcock
ATTORNEY.

Patented Oct. 20, 1936

2,057,855

UNITED STATES PATENT OFFICE 2,057,855

OPHTHALMIC LENS SUSPENSION

Robert G. Stayman, Ashtabula, Ohio, assignor of one-fourth to William S. Babcock, Columbus, Ohio Application April 19, 1934, Serial No. 721,357

1 Claim. (Cl. 88—47)

The invention to be hereinafter described relates to ophthalmic lens suspension.

There are many constructions and devices for mounting such lenses. Generally speaking, the mountings are either frames, or they are rimless. Frames, in the majority of cases extend completely about the edge or rim of each lens. In the rimless type of mounting, the end-pieces may be connected both to the inner edges and to the outer edges of the lenses. That is the case where temples are used. When temples are not used, the end-pieces are connected to the inner edges only, as will be readily understood. When the proper lenses have been selected, it is essential of course, that they be so mounted as to be readily maintained in proper position whenever properly worn. And, of course, as nearly as practicable, unobstructed vision or view must be provided. With the rimless type, the end-pieces extend slightly within the inner edge or, when temples are worn, within both the inner and outer edges. They necessarily are somewhat within the normal line of vision. One well known effort to remove the outer end-piece from the line of vision raises it toward the upper outer edge. While less in the line of vision, it still is in the line of vision, somewhat. Furthermore, that still leaves the end-pieces at the inner edges in their places, considerably in the line of vision. The net result is an improved and less objectionable position for one of the two end-pieces of each lens. And, of course, even that slight improvement is not applicable to the end-pieces at the inner edges of the lenses—the edges nearest the nose. So, it would be applicable only to the rimless type using temples. For the type using full frames or rims, the temples were simply connected higher on the rims. And, as is well known, all rims are more or less visible to the wearer. That, obviously, means that they are somewhat in the line of normal vision. Since the end-piece connection is at one or the other end of the lens, any slight looseness of such connection permits the lens to swing down about that point as a pivot, so that the focal center drops below proper operative position. This has long been universally recognized as a serious trouble in all cases of astigmatism corrections, and bifocals.

Especially, where a rigid bridge is used, the end-piece connection to the inner edge of the lens provides a weak point which readily breaks out if the lens is swung at an angle to the bridge. It is a point where many breaks occur. Likewise, a sudden excessive spreading of a temple frequently breaks out an angular place where its end-piece connects with the lens. And, in the rimless type, having temples, since there are connections at opposite edges of each lens, any such movement of a temple or similar strain of the corresponding bridge end-piece, will be transmitted through the lens to the end-piece at the opposite edge. Then the lens will break at one or the other of the end-pieces. This is a very frequent occurrence. The loss in lenses is very heavy because of it.

It has always been an important aim, too, to make as inconspicuous and unnoticeable as practicable, any connection or attachment or other device, which may be applied to a lens.

The present invention has been devised to avoid all of the above and other objections and provide a simple, efficient, durable and practicable lens suspension with minimum strain, maximum freedom of lens movement both relatively to the lens suspension and to the other lens, maximum freedom of normal vision, unchanging focal center, and minimum conspicuousness.

In order to more clearly disclose the construction, operation and use of the invention, reference should be had to the accompanying drawing forming part of the present application. Throughout the several figures of the drawing like reference characters designate the same parts in the different views.

In the drawing:—

Figures 1, 2, 3, 4:
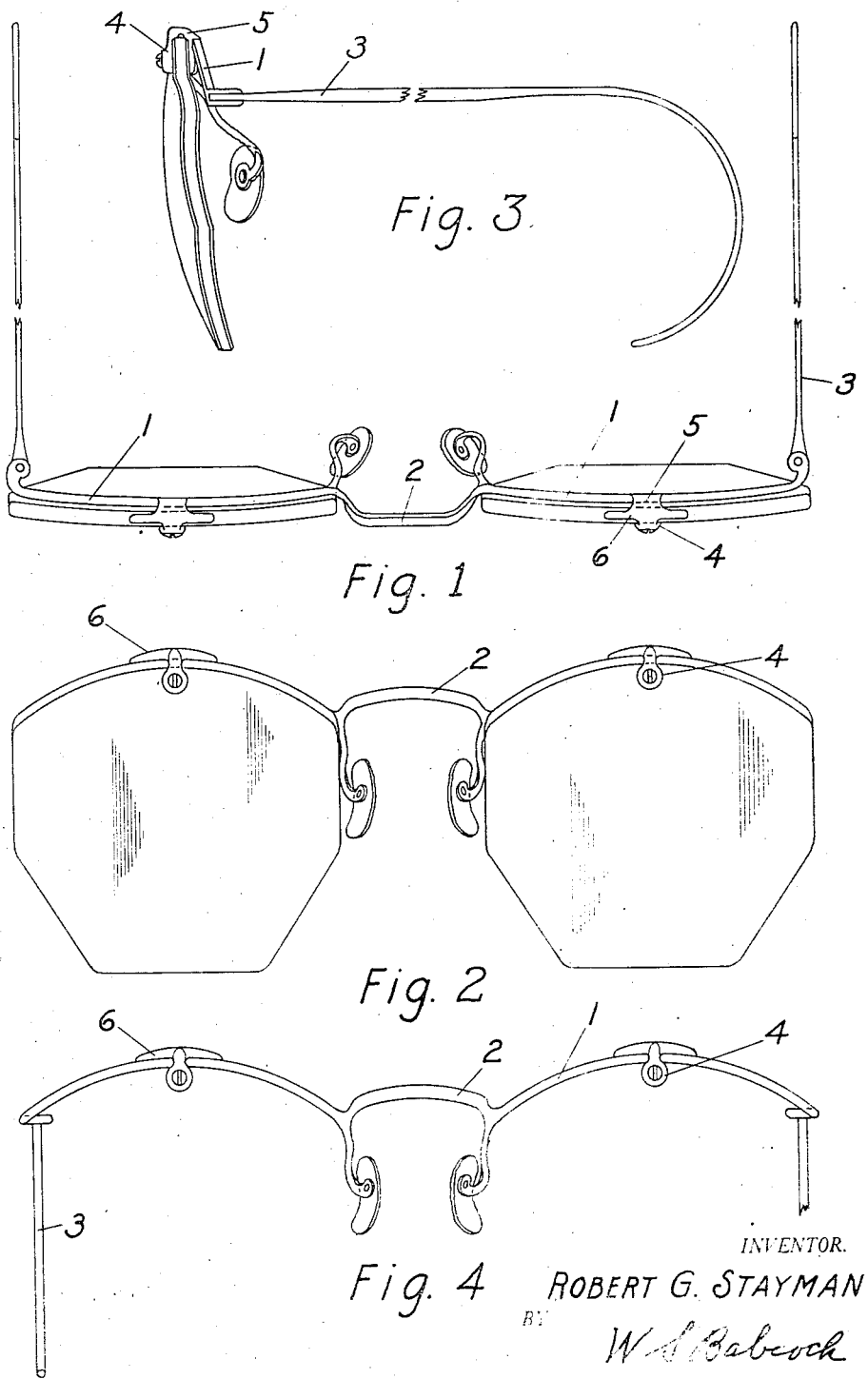
Fig. 1 is a top plan view of the invention, applied, with temples broken out.
Fig. 2 is a front view.
Fig. 3 is a left hand side elevation, with temple broken out.
Fig. 4 is a front view of a preferred form of the front, alone.

While the lens shown is octagon, the invention is in no degree or sense limited by the type or kind of lens. Practically any ophthalmic lens may be used. The invention is in the suspension for the lens, not in the lens itself. In the preferred form, the invention comprises two similar substantially rigid suspension bars 1, each connected at its inner end to a bridge or tie bar 2, and at its outer end, in the usual manner, to a temple or bow 3 of usual and well known type. This connection between temple and suspension, preferably, is made immediately in the rear of the outer part of the top edge of the lens. So made, it and the temple end would be invisible from the front. The whole front, of this invention, so applied, is invisible from the front side of the lens, except the bridge and two end pieces. And, due to the high and inward position of the temples, they are as completely as possible unnoticeable, even from the side. The connection between bridge 2 and suspension bars 1 may be in any manner desired, and may be either flexible or rigid, as desired. This assembly of suspension bars and bridge constitutes a complete front. The nose pad supporting arms may be formed in continuation of the members 1, or they may be formed in continuation of bridge 2, as desired. Or, of course, they may be made separately and suitably connected to either of said parts. As shown in the drawing, they are formed in continuation of the members 1. This temple connection to the outer end of each suspension bar is at the extreme upper outer corner of the lens—at the top. It is as completely out of the line of normal vision as is the top corner of the lens. It can not be in the normal line of vision, even "out of the corner of the eye".

Suspension bars 1, as clearly shown in Fig. 1, are substantially parallel with the rear face of the upper edge of the respective lens and follow the curvatures closely. In manufacture they may easily be made to conform to any such curvatures. Each bar carries, at approximately its longitudinal center, an end-piece 4 which may be of usual and well known construction. However, it will be obvious that any other practical lens connection may be used. There are a number known and thoroughly acceptable for the purposes of this invention. This end-piece, however, does not have the usual perforated arm extending in line with its lens-clamping perforated straps, for connecting the temple end. It is, instead, connected by a web 5 extending substantially at right angles to the straps of the end-piece of the suspension bar 1. As shown in Fig. 1, the web 5 carries the end-piece 4 very slightly forward, to a position adapted to fall directly above the lens edge and above the center of gravity of the lens, approximately. As shown in Fig. 2, the end-piece extends vertically downward from the forward edge of the web 5. In that position, it receives, embraces, and clamps the upper edge of the lens and suspends it directly in operative position. The usual screw or any other acceptable fastening may be used. The shoe 6 of the end-piece extends along the lens edge, as usual, but, because the lens center of gravity is directly below the connection, there is no strain on the shoe. The shoe may, accordingly, be greatly shortened or entirely omitted. The end-piece is connected to the lens approximately directly above the center of gravity so that the slight weight of the lens exerts a direct pull vertically downward on the end-piece. There is, therefore, no tendency to swing pivotally about the connection, and the proper position of the focal center of the lens remains unchanged or permanently in place, at all times, even if the end-piece connection should loosen somewhat. Because of the parallel straps on opposite faces of the lens, drawn securely against the lens by the clamping screws or otherwise, in combination with web 5, there is no tendency of possibility of the respective lens swinging back and forth about bar 1 as a pivot or center. Suspension bars 1, preferably, are rigid. They, with bridge or tie bar 2, extend completely across the front, from one temple to the other, and are entirely separate from and independent of either and both lenses. Consequently, excessive outward springing of either flexible temple has absolutely no effect on either lens. Similarly, turning, twisting or other excessive movement of the bridge or tie bar 2 or of a nose pad arm has no effect on either lens. And, since there is only one place at which each lens is connected, there can be no transmission of strain through the lens from one connection to another. Since bars 1 are rigid, parallel with the respective lens face, and slightly spaced therefrom, no amount of flexing of the temple or bridge can force the bar into engagement with the lens, with possible breaking.

Obviously, a flexible bridge or similar connection may be used as the connection between the suspension bars. That is the preferred construction. That, of course, permits bodily movement of each bar 1 and its lens, independently of the others. Likewise the bridge may be attached to the suspension bars at any of the various positions desired. The connection, as devised and positioned in this case, falls at the thickest part of most lenses. This is due to the fact that most corrections of astigmatism are of plus cylinder axis of nearly 90° or nearly vertical with thickest part of the lens at top. That being the case, the straps or clamps of the end-piece, when such type connection is used, may be materially shortened, thereby raising it nearer the top edge and making it the least possible noticeable or conspicuous.

The space between the lens and its respective suspension bar 1 is very, very slight. Consequently, when the glasses are worn, the bar 1 will be between the lens and the brow of the wearer. Actually, in use, each bar will just about touch the corresponding brow of the wearer. This just very slightly spaces the lens from the brow and keeps the lens completely free from perspiration and moisture which, when working in a warm plant or place or in warm weather, is a considerable source of annoyance. Each suspension bar is parallel both with the rear face curvature of the upper edge of its respective lens and with the top edge curvature. The top surface of each suspension bar is just about in the same curved plane as the top edge of the corresponding lens and, being in the rear, is invisible when worn. And in that location it is entirely out of the line of normal vision.

Since the lens no longer needs to be drilled through either the inner or the outer end for the usual mountings, it may be ground much thinner, as there is no need for the extra glass to take the strain of the connections. Lenses suspended independently of each other by this single connection suspension may, therefore, be made appreciably lighter. In the heavier lenses this is an appreciable and valuable gain, not possible by any other mounting.

By the substantially rigid suspension bars with the bridge, extending the full width of the pair of glasses, the front construction definitely, properly spaces the temples horizontally, in the same general manner as they are so spaced by an ordinary frame or by connection through the end-pieces with the outer edges of a pair of lenses. On the other hand as will be obvious, the temples are higher than is possible by any other construction, and thereby completely removed from all normal vision. In addition, no special construction is required for this connection. A simple straight pivot, as in the usual end-piece and temple connection is all that is required. Such a front is as rigid and shape-retaining as is any complete frame or rimless assembly.

The term front, as herein used is to be understood as including, especially, all three types herein above disclosed, as well as all other types of fronts not inconsistent, in application, with this invention.

While the invention has been illustrated as used with temples or bows, it will be obvious that the bows or temples are not at all essential. They may be entirely omitted and the usual nose-grip used for supporting the lenses on the nose, all as in usual and widely known practice. In such case, the outer half of each bar 1 may be omitted. Each bar will then extend from the bridge to the lens suspension means at 4. Or as a further modification, a single upwardly curved or arched bar extending bridge-wise from the top-center of one lens to the top-center of the other may be used with the end piece 4 at each end embracing the lens edge for suspension from above its respective center of gravity. Each nose-pad arm would be provided with a branch directed outwardly and upwardly to follow the lens edge to the lens suspension point, and there merging with the end of the single bar 1. This would be particularly applicable to the Oxford type. It is believed that no additional illustration will be necessary as the constructions are obvious.

The lens suspension of the present invention provides absolutely clear and entirely unobstructed view in every normal line of vision. There are no temples in the side vision line. There is no end-piece connection at either the inner or the outer edge of the lens. The single point of suspension is at the highest point of the lens and closest possible to its edge. Only by purposely looking directly upwardly at it, may it be deliberately brought into a very abnormal line of vision. It is entirely considerably above the normal line of vision.

It should be borne in mind that the single point suspension of each lens from its respective suspension bar need not be by the particular type of end-piece illustrated. There are a considerable number of lens connections known and used. Most of them are single-point connections in which two very small perforated straps embrace the lens edge and receive a screw which is passed through one strap, through an alined perforation in the lens near its edge and threaded into the other strap, the two straps clamping the lens face as the screw is tightened. Another form uses a fusible plug in place of the screw, in well known manner. These connections are at the inner and/or outer end of the lens and are provided with circumferentially extending shoes or straps to engage the edges of the lens to prevent it from sagging down or dropping vertically so that its focal center will be below its proper line of normal vision. There are, too, single connections in which the lens is secured at more than one point. Any connection may be used which will adequately secure the lens in its desired position from the suspension bar; a relatively small and inconspicuous, single point, suspension means being preferred. However, the term "means" used in the claim in connection with this feature, is intended to include any and all such lens connection constructions and devices and is to be interpreted that way.

The invention comprises a totally and entirely new type and construction of front in combination with a single suspension connection for lenses. The term front has been used and is to be understood and interpreted as including, among others, all types of fronts hereinabove set forth, both illustrated and described.

Many changes may be made in the construction, arrangement and disposition of the various parts of the invention, within the scope of the appended claim, without in any degree departing from the field of the invention, and it is meant to include all such within this application wherein only a preferred form and several modifications have been shown, merely by way of illustration, and with no thought of, in any degree or manner, limiting the application by such showing.

Having thus described my invention, what I claim and desire to protect by Letters Patent, is:—

A suspension for ophthalmic lenses comprising a bar having the curvature of the rear upper edge of a lens, disposed parallel to said upper edge, in the rear thereof and spaced therefrom in position to prevent contact between the lens and a wearer's brow, a web extending forwardly from the approximate longitudinal center of said bar, and means depending from said web and adapted to engage the upper edge of a lens at a point approximately directly above the center of gravity of said lens.

ROBERT G. STAYMAN.